US009496090B2

(12) United States Patent
Eilertsen

(10) Patent No.: US 9,496,090 B2
(45) Date of Patent: Nov. 15, 2016

(54) METHOD OF MAKING GRAPHENE ELECTROLYTIC CAPACITORS

(71) Applicant: Custom Electronics, Inc., Oneonta, NY (US)

(72) Inventor: Thor E. Eilertsen, Oneonta, NY (US)

(73) Assignee: Custom Electronics Inc., Oneonta, NY (US)

(*) Notice: Subject to any disclaimer, the term of this patent is extended or adjusted under 35 U.S.C. 154(b) by 0 days.

(21) Appl. No.: 14/512,630

(22) Filed: Oct. 13, 2014

(65) Prior Publication Data

US 2016/0276108 A1 Sep. 22, 2016

Related U.S. Application Data

(62) Division of application No. 13/659,508, filed on Oct. 24, 2012, now Pat. No. 9,105,406.

(51) Int. Cl.
| | |
|---|---|
| *H01G 9/04* | (2006.01) |
| *H01G 9/042* | (2006.01) |
| *H01G 9/00* | (2006.01) |
| *H01G 9/07* | (2006.01) |
| *H01G 9/02* | (2006.01) |
| *H01G 9/035* | (2006.01) |
| *H01G 9/145* | (2006.01) |

(52) U.S. Cl.
CPC ............ *H01G 9/042* (2013.01); *H01G 9/0032* (2013.01); *H01G 9/0036* (2013.01); *H01G 9/02* (2013.01); *H01G 9/035* (2013.01); *H01G 9/07* (2013.01); *H01G 9/145* (2013.01)

(58) Field of Classification Search
CPC ............. H01G 2009/0007; H01G 2009/0025; H01G 2009/04; H01G 9/07
See application file for complete search history.

(56) References Cited

U.S. PATENT DOCUMENTS

| | | | |
|---|---|---|---|
| 6,031,711 | A | 2/2000 | Tennent |
| 6,762,237 | B2 | 7/2004 | Glatkowski |
| 7,015,142 | B2 | 3/2006 | DeHeer |
| 7,199,997 | B1 | 4/2007 | Lipka |
| 7,623,340 | B1 | 11/2009 | Song |
| 7,852,612 | B2 | 12/2010 | Zhao |
| 2009/0061312 | A1 | 3/2009 | Zhamu |
| 2009/0325071 | A1 | 12/2009 | Verbrugge |
| 2010/0035093 | A1 | 2/2010 | Ruoff |
| 2010/0195261 | A1 | 8/2010 | Sweeney |
| 2010/0195263 | A1 | 8/2010 | Sweeney |
| 2010/0296227 | A1 | 11/2010 | Chacko |
| 2011/0033746 | A1 | 2/2011 | Liu |
| 2011/0041980 | A1 | 2/2011 | Kim |
| 2011/0149473 | A1 | 6/2011 | Eilertsen |
| 2011/0157772 | A1 | 6/2011 | Zhamu |
| 2011/0183180 | A1 | 7/2011 | Yu |

(Continued)

OTHER PUBLICATIONS

Bae et al., Roll-to-roll Production of 30-inch Graphene Films for Transparent Electrodes, Nature Nanotechnology, Jun. 20, 2010, pp. 574-578, vol. 5 Aug. 2010, Nature Publishing Group, Published Online.

(Continued)

*Primary Examiner* — Dion R Ferguson
(74) *Attorney, Agent, or Firm* — Hoffman Warnick LLC

(57) ABSTRACT

The disclosure describes an improved electrolytic capacitor, more specifically, a method of making an electrolytic capacitor with a graphene-based energy storage layer and dielectric. The electrode with layered graphene energy storage and dielectric layers may be used in a variety of electrolytic capacitor configurations.

14 Claims, 5 Drawing Sheets

(56) References Cited

U.S. PATENT DOCUMENTS

2011/0286147 A1    11/2011   Chen
2012/0134072 A1    5/2012   Bae
2014/0030590 A1*   1/2014   Wang ................ H01B 1/04
                                                        429/211

OTHER PUBLICATIONS

Lin and Yang, Carbon Nanotubes Grown on Nanoporous Alumina Templates/Aluminum Foil for Electrodes of Aluminum Electrolytic Capacitors, Journal of the Electrochemical Society, Dec. 31, 2009, The Electrochemical Society, Pennington, NJ, USA.

Malig et al., Wet Chemistry of Graphene, The Electrochemical Society Interface, Spring 2011, pp. 53-56, vol. 20, No. 1, The Electrochemical Society, Pennington, NJ, USA.

El-Kady et al., Laser Scribing of High Performance and Flexible Graphene-Based Electrochemical Capacitors, Science, Mar. 16, 2012, pp. 1326-1330, vol. 335 No. 6074, American Association for the Advancement of Science, Washington, DC, USA.

\* cited by examiner

METHOD OF MAKING GRAPHENE ELECTROLYTIC CAPACITORS

RELATED APPLICATIONS

This application is a divisional of application Ser. No. 13/659,508 filed Oct. 24, 2012.

FIELD

The invention relates to the field of electrolytic capacitors and, more specifically, the manufacturing of dielectric and energy storage structures therein.

BACKGROUND

Electrolytic capacitors are well known in the art and have been used in energy storage, transfer, and conditioning applications since the early $20^{th}$ century. Conventional electrolytic capacitors are constructed from aluminum foil current collectors, both of which has an oxide layer, the anode has the thicker of the two, that acts as an insulating dielectric. The aluminum foil current collectors are held apart by a paper spacer soaked in electrolyte. The aluminum foil with the oxide layer acts as the anode and the electrolyte and other aluminum foil act as the cathode, the electrolyte providing additional free energy (electron source) compared to a traditional capacitor comprised solely of current collectors separated by an insulating dielectric layer. Electrolytic capacitors are generally formed in a layered structure, then rolled and packaged in a cylindrical canister that provides leads electrically connected to the anode and cathode respectively.

A common alternative electrolytic capacitor design uses sintered tantalum (creating a porous surface with a large surface area) with an insulating oxide layer as the anode and the liquid electrolyte acting as the cathode (electrically connected to the outer canister). In this type of capacitor, the electrolyte is both a current collector and source of electrons.

Still another alternative is a polymer electrolytic capacitor, wherein a solid electrolyte is used instead of a liquid electrolyte. The solid electrolyte is impregnated in the separator sheet and provides greater physical stability and reliability due to the lack of a liquid component.

Electrolytic capacitors are distinguishable from electric double-layer capacitors (ELDCs), also known as supercapacitors or ultracapacitors. ELDCs are electrochemical capacitors that use a nanoporous (high-surface per unit volume) material, such as activated carbon, rather than a more traditional insulating dielectric. They still use a stacked configuration between current collectors, though the adjacent current collectors may in fact be part of the same rolled substrate. But between the current collectors are layers of nanoporous materials and a source of charge carriers (such as an electrolyte) with a thin separator to create the double-layer effect. So, while an ELDC contains an electrolyte, it is not an dielectric electrolyte as in the electrolytic capacitor understood by those of skill in the art.

A variety of materials have been used for dielectrics, electrodes, electrolytes, and other components of both electrolytic capacitors and ELDCs. While the two types of devices may have some similar structural and electrical characteristics, the performance characteristics and electrochemical nature of ELDCs mean that there are different design parameters and similar materials may not be functionally equivalent in ELDCs versus electrolytic capacitors.

Graphene is a carbon structure that is a one-atom-thick planar sheet of sp2-bonded carbon atoms. They form a two-dimensional hexagonal crystal lattice (though it has been observed to have a tendency to roll or buckle). Graphene is the basic building block of other graphitic structures, being rolled into nanotubes, balled into fullerenes, and stacked into graphite. A graphene platelet is a small stack of graphene sheets that are generally 1-100 nanometers thick and up to 100 micrometers in diameter. Stable graphene platelets are typically at least 3 atomic layers thick and thousands of atoms across. The difference between graphite (graphene platelets are a naturally occurring component of graphite) and graphene platelet structures is a consistent coplanar orientation among the graphene platelets.

Graphene is presently being explored for use in a variety of electrical components, including ELDCs and nano-scale integrated circuit components. In ELDCs, graphene is primarily under consideration as coated electrodes or current collectors or in a variety of graphitic nanostructures to provide a nanoporous alternative to activated carbon. A nano-scale electrostatic capacitor comprised of graphene sheet electrodes and a graphene derived thin film as the insulating layer has also been proposed.

SUMMARY

Technical Problem

Electronic equipment is subject to damage from variations and interruptions in power supply. While some advances have been made in de-sensitizing electronic equipment, there is a practical limit on this effort since sags and interruptions are characterized by a decrease or complete loss of voltage, which requires that the electronic equipment have enough internal energy storage to ride through the sag or interruption. ELDCs have gained popularity because of their increased capacitance but have not solved the problem because of their low voltage limitation, (2.7 volts) and their longer RC time constant does not allow them to be effectively utilized at 60 Hz.

Traditional electrolytic capacitors offer capacitance ranges up to 2500 uF with working voltages up to hundreds of volts DC. ELDCs offer capacitance ranges reaching kFs with working voltages of only a few volts (some electrochemical components cannot tolerate higher voltages). Traditional electrolytic capacitors lack the capacitance for energy storage applications but have a much higher voltage standoff. ELDCs operate at much higher energy densities, but with a very low voltage standoff. There is a performance gap between traditional electrolytic capacitors and ELDCs for higher capacitance (than traditional electrolytic capacitors) and higher voltage standoff (than ELDCs).

There is a need for an up-front higher capacitance charge/discharge electrolytic capacitor for effective filtering in two impedance polar quadrants with fast response to preserve sensitive loads. Unlike existing electrolytic capacitors, an improved electrolytic capacitor would suffer no depletion of charge below 63% for 2 to 3 seconds of current demand.

Solution to Problem

The present invention is an improved electrolytic capacitor, more specifically, an electrolytic capacitor with a graphene dielectric layer, and a method of making the improved electrolytic capacitor. The graphene dielectric layers may be used in a variety of electrolytic capacitor configurations, including as part of a cathode electrode with a layered graphene energy storage layer and an anode with a strongly dielectric graphene dielectric layer.

In one embodiment, the capacitor includes a first electrode comprised of a first current collector and a second electrode comprised of a second current collector. The first electrode includes a dielectric disposed adjacent the current collector, wherein the dielectric comprises a layered graphene structure. A separator is disposed between the first electrode and the second electrode and an electrolyte is impregnated between the first electrode and the separator and between the second electrode and the separator.

In another embodiment, a series of method steps are used to assemble a capacitor. A layered graphene structure is applied to a first current collector to form a first electrode with a dielectric layer. A separator is put adjacent the dielectric layer of the first electrode. A second electrode is put adjacent the separator, wherein the first electrode, separator, and second electrode define a layered stack. The layered stack is impregnating with an electrolyte.

In another embodiment, a layered graphene structure is used in an electrode for an electrolytic capacitor. The electrode includes a graphene dielectric comprised of at least one layer of a single layer graphene film and a current collector. The single layer graphene film is substantially parallel to the current collector and is substantially non-conductive up to a selected voltage.

Advantageous Effects of Invention

The present invention will provide an improved electrolytic capacitor for a variety of electrical applications. It will provide an up-front higher capacitance charge/discharge electrolytic capacitor for effective filtering in two impedance polar quadrants with fast response to preserve sensitive loads. It will bridge the performance gap between traditional electrolytic capacitors and ELDCs for higher capacitance (than traditional electrolytic capacitors) and higher voltage standoff (than ELDCs). The improved electrolytic capacitor not only absorbs undesirable noise but is able to output clean (from an energy conditioning perspective) energy on demand.

DESCRIPTION OF EMBODIMENTS

Figure 1:
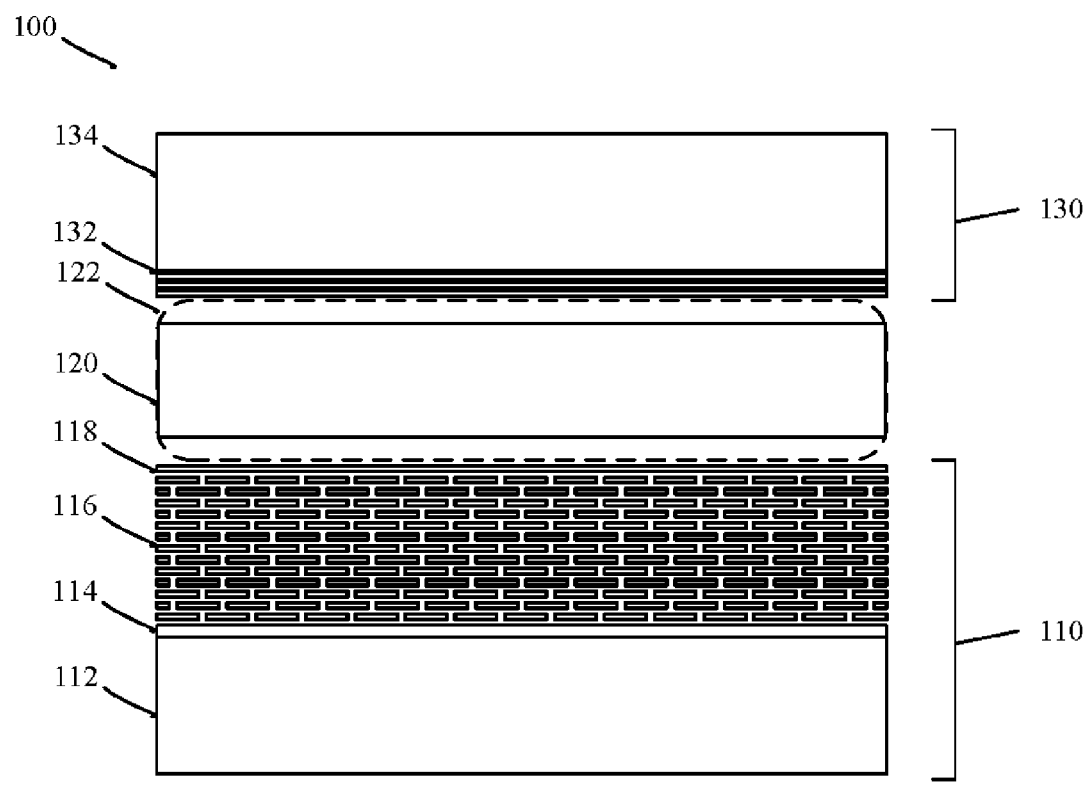
FIG. 1 Diagram of the layered structure of an example embodiment of an electrolytic capacitor in accordance with the present invention.

FIG. 1 shows the graphene electrolytic capacitor (GEC) 100 of the present invention. GEC 100 is a double layer capacitor, or 2 capacitors in series, akin to its cousins the conventional electrolytic capacitor and ELDC. The GEC 100 has a capacitance that lies between the maximum capacitance of its conventional electrolytic counterpart (2500 µF) and less than most ELDCs; its voltage stand-off is less than the conventional electrolytic but much larger than the ELDC.

GEC 100 is a layered stack of functional subcomponents similar to other electrolytic capacitors and ELDCs. FIG. 1 is an idealized cross-section of the stack to show the component layers. In reality, these layers are formed in strips or coated on top of, rolled, pressed and placed in a cylindrical canister with appropriate leads for connecting the finished capacitor to an electric circuit in the desired application.

GEC 100 includes a first electrode 110. The first electrode 110 is a graphene-based cathode, unlike the electrodes of prior art electrolytic capacitors. More specifically, the graphene dielectric 118 is laminated or coated to the aluminum current collector (along with graphene energy layer 116 and graphene conductive paste 114). This is unlike the electrolytic capacitor's dielectric, aluminum oxide, which is formed when the current collector is electrochemically anodized in a bath of hot electrolyte. The first electrode 110 includes a current collector 112, a conductive coating 114, a graphene energy storage layer 116, and a graphene dielectric 118. Note that the designation of "first" and "second" in reference to electrodes or other structures is an arbitrary way of distinguishing between two or more structures of similar apparent function or composition. It is not to be assumed that "first electrode" is synonymous with cathode or "second electrode" is synonymous with anode, as these designations may vary based on the specific configuration and application of the capacitor or component electrode.

The current collector 112 may be selected from a variety of conductive elements known to those of ordinary skill in the art, such as aluminum and tantalum. In one embodiment, the current collector 112 is made from capacitor-grade aluminum foil having at least 99.99% purity. Commercially available "Cathode Foil" that is chloride etched 10% is well suited to the application. The etched surface of the current collector 112 provides a binding surface for the graphene layers described below. Foil thickness may be selected from the range 17 um to 35 um, with 25 um being a preferred thickness. Because GEC 100 has a separate dielectric layer, there is no need for oxide formation on current collector 112 and oxide formation should be limited during material selection and assembly.

Current collector 112 provides a base structure for assembling the layers of first electrode 110. The next layer is a thin electrically conductive coating, conductive coating 114, to shift the current flow from energy storage layer 116 into an orientation along the axis of current collector 112. The application of a conductive coating prior to the application of an energy storage layer has been shown to enhance efficiency in some capacitor designs. In one embodiment, the conductive coating 114 is a conductive graphene paste with graphene platelets substantially oriented to direct the flow of current from the energy storage layer 116 along the axis of current collector 112. The preferred thickness of the conductive graphene paste 114 is 1 um. Conductive coatings other than graphene paste may be used as a functional equivalent for the conductive graphene paste in some embodiments.

In an alternate embodiment (not shown in FIG. 1), no separate conductive graphene paste is applied and the energy storage layer 116 includes graphene oriented along the axis of the current collector 112 to provide the necessary directionality of current flow. This alternate embodiment saves a coating application and may reduce overall material thickness.

The next layer after the conductive coating 114 is energy storage layer 116. Energy storage layer 116 provides a pore structure matrix to achieve higher energy density. The pore size and the pore size distribution (PSD) of the energy storage layer can be optimized to the ion size of the electrolyte 122 to achieve superior energy density. In one embodiment, the energy storage layer 116 uses successive sheets of graphene platelets formulated to create the desired average pore size and density. The graphene platelets configured in sheets have a platelet thickness of 3-7 graphene sheet layers or 1-20 nanometers and define ion receiving pores of 2-7 nanometers to match the charged ion sizes. The graphene platelet size ranges from 5 to 50 um. Exfoliated graphene may be used for this purpose. The graphene platelet layers are applied to achieve a desired dry coating thickness. For example, a 35 um dry coating thickness with a known structure matrix will provide a capacitance of 20 to 50 F/g. In one embodiment, a desired energy storage thickness is selected from the range of 30 to 60 um. Note that the binders used in the graphene slurry for producing the graphene layers are compatible with the electrolyte.

The next layer after the energy storage layer 116 is the dielectric layer 118. Single layer graphene films may be stacked to form dielectric layer 118 and provide the high voltage dielectric for GEC 100 to function. Each single layer graphene film has a defined edge, surface, platelet size, and platelet distribution. While an idealized embodiment may be able to use a single continuous sheet of graphene to provide a near perfect dielectric barrier, current technology for producing graphene does not enable such an embodiment. Instead, successive layers are used to compensate for voids and other defects in individual layers to achieve the desired dielectric characteristics. An extrusion process may also provide an composite graphene film that could be coated directly or laminated in a fashion later. Weight and thickness of the dielectric are minimized while meeting the desired electrical characteristics. For an example 50 volt embodiment, dielectric layer 118 of approximately 0.07 to 0.1 um (70 to 100 nm) is required, assuming proper formulation of the single layer graphene sheets. In one embodiment, the desired dielectric thickness is selected based on the desired voltage specifications of the device with the general relationship of 1 to 2 nm of dielectric thickness per volt, for example 1.2 nm per volt. Voltage breakdown results from voids formed in the dielectric layer 118, so the graphene films need to be largely defect free. Large voids, for example 1 um or larger pin holes, should be avoided and a graphene film meeting this criteria would be considered a substantially defect-free continuous graphene sheet.

The graphene layers (conductive coating 114, energy storage layer 116, dielectric layer 118) of the first electrode 110 are created using thin film application of graphene platelets in desired configurations for the various functional layers. Existing graphene synthesis approaches produce large area defect free graphene platelets and can be functionally tailored for the required thin film graphene sheet parameters. The elongated graphene platelets are aligned in the same direction as the current collector, which produces conductivity 5X or higher than can be achieved by the etched foil of the standard electrolytic capacitor. The overlaying platelets gain a maximum thickness up to ½ micron by the production coating process forming the dielectric. Because there is virtually no electrical and thermal conduction vertically through the platelets in conjunction with a thin high k dielectric, the voltage stand off window may exceed 50 volts or more. The electrolytic aluminum oxide dielectric constant is in the several hundred range, while graphene will exceed this. By increasing the conductance or mobility of the electrons in the solid-state graphene, in addition to the added capacitance gain, ESR is decreased. An RC time constant of 16.6 ms or less meeting or exceeding the 60 Hz standard frequency can be achieved. By having a smaller time constant a higher quality filtering is achieved and ripple harmonics are reduced or eliminated.

Thin film graphene sheets are formulated for the desired parameters for each application of GEC 100. These high level parameters may include: (i) a high capacitive density, targeting up to 5 farads per cell and beyond; (ii) a large surface area, 2600 $m^2/g$ has been projected to yield over 150 $F/cm^3$; and (iii) initial voltage withstanding window, up to 50 volts based upon the very high resistive value inherent when vertically stacking graphene platelets. Graphene platelet selection (thickness, diameter, rate of pin hole defects, etc.) and layer thickness may be controlled for desired parameters. By tuning the electrolyte 122, polarizable in nature, to the graphene structures in GEC 100 hundreds of volts can be achieved. The ESR of the first electrode 110 may reach or exceed that of aluminum of 0.0002 ohms allowing a time constant of less than 1 ms. Capacitor filtering for line frequency may be less than 16.3 ms in order for the reduction of unwanted voltage noise sags and swings.

The first electrode 110 is adjacent separator 120 in GEC 100. The separator 120 electrically separates the first electrode 110 from the second electrode 130, defining the separate anode and cathode portions of the capacitor and preventing short circuits. The separator 120 is generally made from an cellulose medium that can be impregnated with the electrolyte 122, such as various separator papers that are well known in the art. In one embodiment, Kraft paper, an absorbent cellulose paper, is selected for desired electrochemical, chemical, mechanical, and electrical properties. Depending on the thinness of the selected paper, it may be used to assure adequate capacity for electrolyte storage and voltage breakdown. In alternate embodiments, various cellulose separator papers engineered for added durability and specific porosity, mechanical strength and high temperature resistance may be used as the separator 120.

The separator 120 is impregnated with an electrolyte 122. The electrolyte 122 is absorbed in the separator 120, but also able to engage the surface of the adjacent first electrode 110 and second electrode 130. In one embodiment, the electrolyte 122 is a non-aqueous electrolyte consisting of a weak acid, a salt of a weak acid and a solvent. The solvent is generally one of the polyhydroxyl alcohol group such as a glycerol or glycol although in some cases it may be replaced with the use of a hydroxy alkylamine. The salt of the weak acid is generally a salt of the weak acid employed although this is not necessarily always true. Non-aqueous electrolytes may also contain inert filler materials, for the purpose of increasing viscosity, such as bentonite, diatomaceous earth, silica gel, aluminum oxide, agar-agar, gum tragacanth and starch. In some instances, inert substances are added to the electrolyte for the purpose of increasing electrical conductivity. Such substances may be magnetite, graphite, colloidal graphite, carbon, colloidal silver or powdered metals such as aluminum and copper. Straight organic acids of the water soluble types or organic acids associated with a salt may be employed. For example, acetic acid or formic acid alone or in combination with such salts as ammonium acid borate, sodium borate, sodium potassium tartarate, ammonium phosphate, sodium acetate or ammonium acetate may be used. Illustrative of the aliphatic acids which may be employed are: Propionic acid, acrylic acid and butyric acid. Derivatives of the mono-carboxylic acids may also be employed, these being represented by such compounds as the following: lactic acid, hydroxy-acrylic acid, crotonic acid, ethylene lactic acid, dihydroxy propionic acid, isobutyric acid, diethyl acetic acid, iso-amyl acetic acid and iso-butyl acetic acid. Solid electrolytes may also be employed including poly(3,4-ethylenedioxythoiphene) or PEDOT combined with polystyrene sulfonate from solvents such as propanediol, methyl pyrrolidone, dimethylsulfoxide, or sorbitol and tetracyanoquinodimethane or TCNQ combined with tetrathiafulvene or TTF from such solvents.

The method of impregnation of the electrolyte 122 into the separator 120 may involve immersion of the elements and application of vacuum-pressure cycles with or without heat or, in the case of small units, just simple absorption.

In one embodiment, selection of the pore structure matrix in the energy storage layer 116, selection of the separator paper for the separator 120, and selection of the electrolyte 122 provide an opportunity to tune the performance of the resulting GEC 100. By matching the ion size of the electrolyte 122 to the pore size of the energy storage layer 116 and the ion conductor size of the separator 120, highly efficient ion transport can be established producing much higher energy densities.

GEC 100 also includes a second electrode 130 to act as the anode for the electrolytic capacitor. The anode electrode 130 includes the aluminum current collector 134 and a graphene dielectric layer 132 which alongside the electrolyte dielectric balances the large voltage differential within the cell. Due to the asymmetric design of GEC 100, second electrode 130 is a much simpler structure. In the present embodiment, the second electrode 130 is a discrete current collector 134 of a composition similar to the current collector 112 in the first electrode 110. The current collector 134 of the second electrode 130 is made from capacitor-grade aluminum foil having at least 99.99% purity. Commercially available "Cathode Foil" that is chloride etched 10% is well suited to the application. The etched surface (not shown) of the current collector 134 of the second electrode 130 may also provide a binding surface. Foil thickness may be selected from the range 17 um to 35 um, with 25 um being a preferred thickness. In order to provide the high voltage capacity for the device, the majority of the voltage must be distributed across the anode. A much thicker dielectric layer 132 on the anode, compared to the cathode, will accomplish this. Based on the dielectric constant of graphene from laboratory testing a 50 to 150 nm thickness would be required for a 50 volt withstand to be accomplished. This would be determined by the application and voltage specifications for the device, whether it be as a pulsed forming network or constant DC. The pulse forming network requires a higher di/dt therefore thicker dielectric. The graphene dielectric layer 132 is formed onto the current collector as an extrusion from the graphene dielectric film and binder material or from a coating onto the current collector 134.

Once the layered stack of the GEC 100 is formed, it is wound and packaged. The appropriate mandrel should be selected based on the package size and physical constraints of the layered structures. In one embodiment, a 3" mandrel is used for winding.

There are a variety of packaging options and lead configurations. When packaging is selected, the flag lead, through which all current is charged and discharged, should be mechanically and electrically robust enough to withstand the voltage and current demands of the rapid changes the GEC 100 is designed for. Specifically, the lead should be rounded and relatively defect free, without burs or sharp edges.

Figure 2:
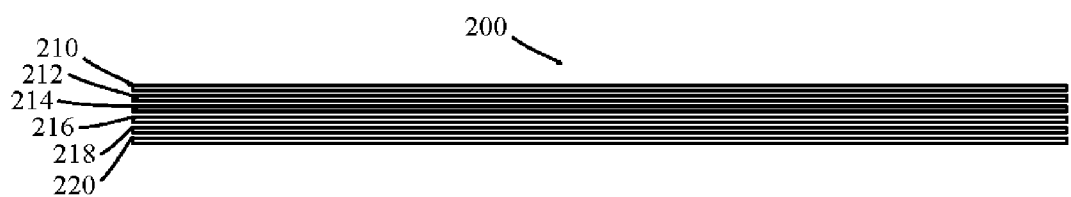
FIG. 2 Diagram of the layered structure of an example embodiment of a graphene dielectric layer for an electrolytic capacitor in accordance with the present invention.

FIG. 2 shows a graphene dielectric 200 in accordance with the present invention, such as may be used for the dielectric layer 118 or dielectric layer 132 in GEC 100. The graphene dielectric 200 includes a plurality of single layer graphene sheets 210, 212, 214, 216, 218, 220. Each of the single layer graphene sheets includes a single layer of graphene platelets arranged in a single coplanar layer. Adjacent graphene platelets in the sheet are deposited in a film such that their edges form a substantially continuous structure with minimal voids defined between them. In one embodiment, no void of greater than 1 um is acceptable and the mean void size is less than 0.1 um (100 nm). While graphene platelets are themselves largely impervious to current flow orthogonal to their plane, voids in each single layer graphene sheet undermine their strong dielectric properties and therefore results in reduced voltage withstanding. For this reason, the graphene dielectric 200 is comprised of a plurality of such single layer graphene sheets to allow each sheet to reinforce the dielectric characteristics of the adjacent sheets and produce a desired dielectric performance. Based on the dielectric performance of the single layer graphene sheets that a given process is capable of producing and the desired dielectric performance of the graphene dielectric 200 as a whole, a desired dielectric thickness can be achieved by determining the number of single layer graphene sheets needed. With graphene platelet thicknesses of 1-2 nm, even a graphene dielectric made up of as many as 20 sheets would be less than 0.1 um (100 nm) thick. In the embodiment shown, the single layer graphene sheets 210, 212, 214, 216, 218, 220 make up the graphene dielectric thickness 200. This embodiment is exemplary only and the actual number of sheets in the dielectric will vary by application, sheet characteristics, and manufacturing process. The graphene dielectric 200 will be substantially impermeable to electric current across the plane (i.e. highly dielectric) for the operating voltages and frequencies for which it is designed.

Figure 3:
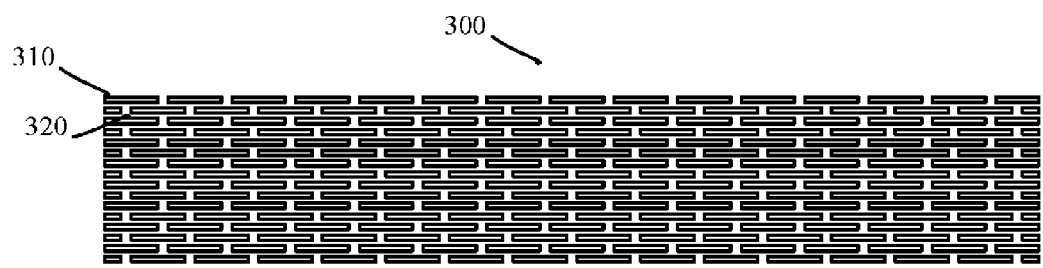
FIG. 3 Diagram of the layered structure of an example embodiment of a graphene energy layer for an electrolytic capacitor in accordance with the present invention.

FIG. 3 shows a graphene energy storage layer 300 in accordance with the present invention, such as may be used in the energy storage layer 116 of GEC 100. Graphene energy storage layer 300 is comprised of a plurality of graphene platelets (for example, graphene platelet 310) arranged in a structural matrix that defines a plurality of pores (for example, pore 320), also known as a pore structure matrix. The pore structure matrix provides an increased surface area for the purpose of increasing the energy storage capacity of a capacitor. Additionally, the pore structure matrix can be tuned to increase the compatibility of the mean pore size in the matrix and the ion size of a selected electrolyte in an electrolytic capacitor. The graphene energy storage layer 300 is produced by depositing a series of graphene platelet films with a known platelet size and spacing between adjacent platelets in coplanar layers to form a three dimensional matrix with the desired characteristics. In one embodiment, the grain size of the substrate upon which the platelet films are initially formed allows control over graphene platelet size and spacing.

FIGS. 2 and 3 show the distinct structures of the graphene dielectric 200 and the graphene energy storage layer 300. While both are comprised of layers of graphene platelet films, the films are controlled in specific ways to achieve very different structures and electrical characteristics. The graphene dielectric 200 uses graphene platelets to achieve a thin (less than 100 nm) structure with a high dielectric value and high voltage standoff by minimizing voids between platelets. The graphene energy storage layer 300 is comparatively thick (10 s of um) matrix structure specifically designed to transfer and hold electric charge in pores defined between adjacent graphene platelets.

Figure 4:
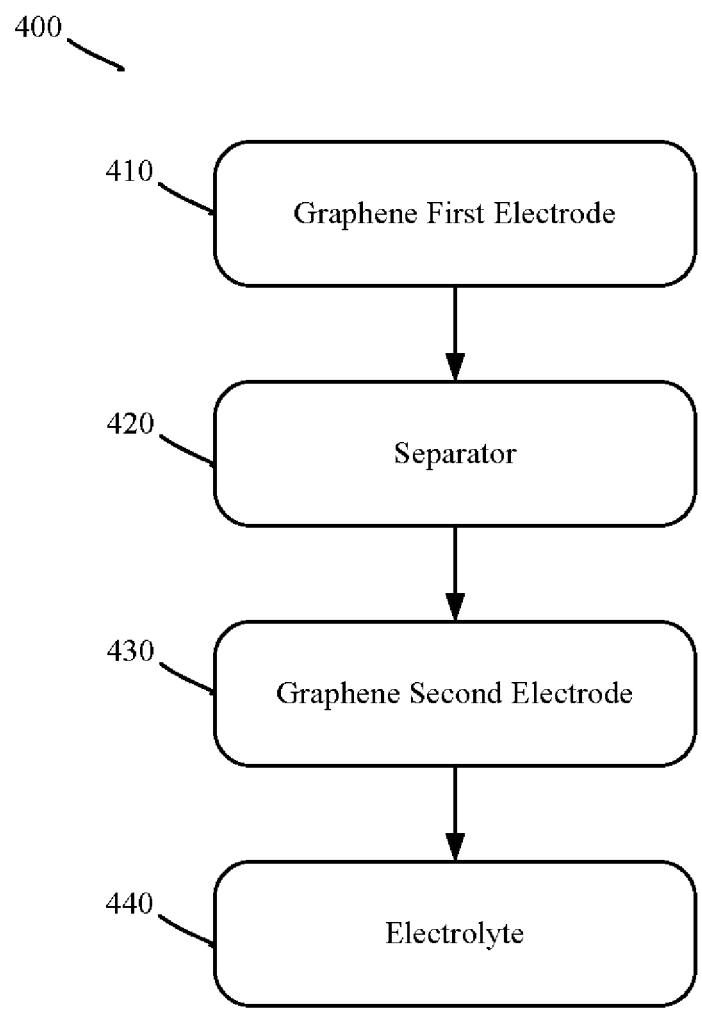
FIG. 4 Block diagram of a method of making an electrolytic capacitor in accordance with the present invention.

FIG. 4 is a block diagram showing a method 400 of manufacturing a graphene electrolytic capacitor, such as GEC 100. In step 410, a layered graphene structure is applied to a first current collector to form a first electrode with a dielectric layer. An example of a layered graphene structure is the graphene layers in the first electrode 110 of GEC 100 (conductive coating 114, energy storage layer 116, dielectric layer 118). The layered graphene structure can be applied to the first current collector directly (using the current collector as a substrate) or transferred from another substrate on which the layered graphene structure is formed, or a combination thereof (where one or more layers are formed on the current collector and others are formed elsewhere and transferred). Example processes for forming graphene layers are the use of thin film manufacturing technologies applied to graphene platelets.

For example, chemical vapor deposition (CVD) can be used to form a graphene thin film. In one embodiment, a copper foil wrapped around a quartz tube is inserted into a quartz reactor with a CH4 precursor and chamber temperature. A specific sequence of pre-heating, mixing with hydrogen, and fast cooling produces a single layer graphene film. In this example, the graphene film takes on the grain size of the copper foil it is grown on. This allows the copper to be annealed to a specific grain size to control the size of the graphene platelets in the resulting graphene film. The graphene film is removed from the copper by dissolving the copper away from the graphene film through the use of ferric chloride or similar etchant. Alternate processes exfoliate graphite into graphene platelets through sonication or high voltage ionic liquids.

In step 420, a separator is put adjacent the dielectric layer of the first electrode to provide a physical separation between electrodes and prevent short circuits. The separator also functions as a repository for electrolyte introduced in a future step. An example separator would be the separator 120 in GEC 100. In one embodiment, the separator is strip of absorbent paper that is placed on the first electrode for winding on a common mandrel.

In step 430, a second electrode is put adjacent the separator, such that the separator is between the first electrode and the second electrode to prevent direct contact between the electrodes. An example second electrode would be the second electrode 130 in GEC 100. In one embodiment, the second electrode is a strip of capacitor-grade aluminum foil that is placed on the separator and first electrode for winding on a common mandrel.

In step 440, electrolyte is added to the layered stack of first electrode, second electrode, and separator to impregnate the separator and engage the adjacent surfaces of the first electrode and second electrode. An example electrolyte would be the electrolyte 122 in GEC 100. Step 440 may involve immersion of the elements and application of vacuum-pressure cycles with or without heat or, in the case of small units, just simple absorption. This step may be completed before or after the layered stack is rolled and/or placed in a cylindrical canister. In an alternate embodiment, the separator is pre-impregnated with the electrolyte prior to placement of the separator in Step 420. This alternate method may be appropriate for viscous or solid electrolytes.

Winding and packaging of the layered stack produces the final capacitor. The appropriate mandrel for winding, canister, seal, and leads should be selected based on the package size and physical constraints of the layered structures and the physical, electrical, and chemical requirements of the intended application.

Figure 5:
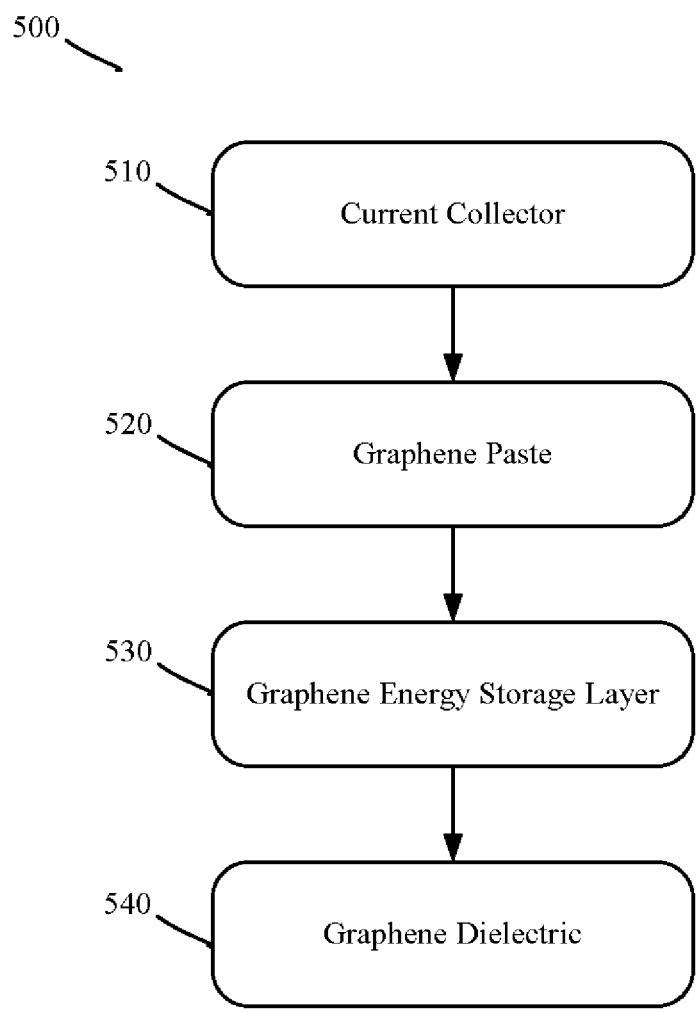
FIG. 5 Block diagram of a method of making a graphene-based cathode for an electrolytic capacitor in accordance with the present invention.

FIG. 5 is a block diagram of a method 500 of making a graphene-based cathode for an electrolytic capacitor in accordance with the present invention. In step 510, a current collector is selected for use in making the electrode. An example current collector would be the current collector 112 in GEC 100. In one embodiment, the current collector is a strip of resilient material, such as a metal foil, that provides a structural base for the layered stack of graphene elements that will be assembled on one of the current collector's surfaces. The layered graphene structure may be applied by forming it directly on the current collector's surface or by forming one or more components on a separate substrate and transferring them to the current collector's surface.

In step 520, a graphene paste conductive coating layer is applied to the current collector to provide a physical and electrical interface between the current collector and subsequent graphene layers. The purpose of the conductive coating layer is to reorient current flow from other graphene layers to be parallel with the axis of the current collector and improve the efficiency of current flow out. It may also serve as an adhesive layer for attaching stacked graphene layers to the current collector. An example graphene paste conductive coating layer would be conductive coating 114 in GEC 100. In an alternate embodiment, a non-graphene conductive coating layer may be employed or no conductive coating layer at all.

In step 530, a graphene energy storage layer is put on the electrode stack such that the conductive coating layer is between the graphene energy storage layer and the current collector. The purpose of the graphene energy storage layer is to improve the energy storage capacity of the capacitor by increasing the electrode surface area. An example graphene energy storage layer would be energy storage layer 116 in GEC 100. In one embodiment, the graphene energy storage layer is composed of a plurality of single layer graphene sheets stacked on top of one another to form a pore structure matrix. The pore structure matrix defines a large number of pores for accepting ions to store energy when charged. The stack of single layer graphene sheets used to form the graphene energy storage layer may be formed directly on the electrode stack or, alternately, formed on another substrate and transferred to the electrode stack.

In step 540, a graphene dielectric is added to the layered graphene structure that forms the electrode. The graphene dielectric provides a dielectric layer for the capacitor. An example graphene dielectric would be the dielectric layer 118 of GEC 100. In one embodiment, the graphene dielectric is formed from a plurality of single layer graphene sheets stacked on top of one another. The graphene sheets have a limited size and frequency of voids to limit the flow of current through the graphene dielectric. The graphene dielectric provides a thin but strongly dielectric layer on the surface of the electrode. The graphene dielectric may be formed directly on the energy storage layer below or may be formed on another substrate and transferred to the electrode stack.

Once the graphene electrode is formed with a layered graphene structure, it may be used to construct a capacitor. In one embodiment, it is used in Step 410 of method 400.

Figure 6:
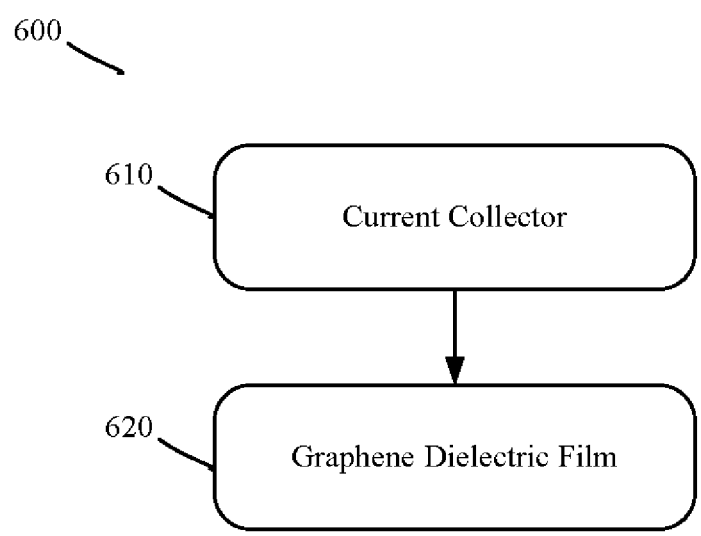
FIG. 6 Block diagram of a method of making a graphene-based anode for an electrolytic capacitor in accordance with the present invention.

FIG. 6 is a block diagram of a method 600 of making a graphene-based anode for an electrolytic capacitor in accordance with the present invention. In step 610, a current collector is selected for use in making the electrode. An example current collector would be the current collector 134 in GEC 100. In one embodiment, the current collector is a strip of resilient material, such as a metal foil, that provides a structural base for the layered stack of graphene elements that will be assembled on one of the current collector's surfaces. The layered graphene structure may be applied by forming it directly on the current collector's surface or by forming one or more components on a separate substrate and transferring them to the current collector's surface.

In step 620, a graphene dielectric is added as a layered graphene structure to the current collector and forms the electrode. The graphene dielectric provides a strong dielectric layer for the capacitor. An example graphene dielectric would be the dielectric layer 132 of GEC 100. In one embodiment, the graphene dielectric is formed from a plurality of single layer graphene sheets stacked on top of one another. The graphene sheets have a limited size and frequency of voids to limit the flow of current through the graphene dielectric. The graphene dielectric provides a thin but strongly dielectric layer on the surface of the electrode. If a graphene dielectric is present in the cathode of the same capacitor, the graphene dielectric in the anode will be substantially thicker, possible by an order of magnitude or more. The graphene dielectric may be formed directly on the current collector or may be formed on another substrate and transferred to the electrode stack.

Once the graphene anode is formed with a layered graphene structure, it may be used to construct a capacitor. In one embodiment, it is used in Step 430 of method 400.

The invention claimed is:

1. A method of making a capacitor, comprising the steps of:
    applying a layered graphene structure to a first current collector to form a first electrode with a dielectric layer, wherein the dielectric layer is formed of at least one film layer of the layered graphene structure;
    putting a separator adjacent the dielectric layer of the first electrode;
    putting a second electrode adjacent the separator, wherein the first electrode, separator, and second electrode define a layered stack; and
    impregnating the layered stack with an electrolyte.

2. The method of claim 1, wherein the step of applying the layered graphene structure includes depositing at least one film layer of single layer graphene substantially parallel to the first current collector to form the dielectric layer with a desired dielectric thickness.

3. The method of claim 1, wherein the step of applying the layered graphene structure includes putting a graphene energy storage layer between the first current collector and the dielectric layer.

4. The method of claim 3, wherein the graphene energy storage layer comprises a plurality of graphene platelets configured in sheets and having a desired energy storage thickness.

5. The method of claim 1, wherein the step of applying the layered graphene structure includes putting a graphene paste conductive coating layer between the current collector and the dielectric layer.

6. The method of claim 1, further comprising the step of applying a second layered graphene structure to a second current collector to form the second electrode.

7. The method of claim 1, wherein the step of applying the layered graphene structure includes applying a plurality of film layers containing graphene to the first current collector to form the dielectric layer with a desired dielectric thickness.

8. The method of claim 7, wherein the plurality of thin film layers each comprise a single layer graphene structure.

9. The method of claim 7, wherein the capacitor has a voltage specification and the desired dielectric thickness is selected from the range of 1-2 nm/volt of the voltage specification.

10. The method of claim 1, wherein the first electrode is an anode of the capacitor.

11. The method of claim 4, wherein the plurality of graphene platelets configured in sheets have a platelet thickness selected from the range of 1-20 nanometers.

12. The method of claim 4, wherein the plurality of graphene platelets configured in sheets define ion receiving pores selected from the range of 2-7 nanometers.

13. The method of claim 4, wherein the desired energy storage thickness is selected from the range of 30-60 um.

14. The method of claim 1, wherein the step of applying the layered graphene structure to the first current collector comprises:
    providing the first current collector as a substrate with a first surface;
    applying a graphene paste conductive coating layer on the first surface of the first current collector;
    applying a graphene energy storage layer to the graphene paste conductive coating layer; and
    applying the dielectric layer by disposing at least one graphene film layer on the graphene energy storage layer.

* * * * *